INVENTORS
ROBERT E. TAYLOR
ROBERT F. BELOW
THOMAS H. WIGGINS
DAVID F. MIEYAL
BY
ATTORNEY

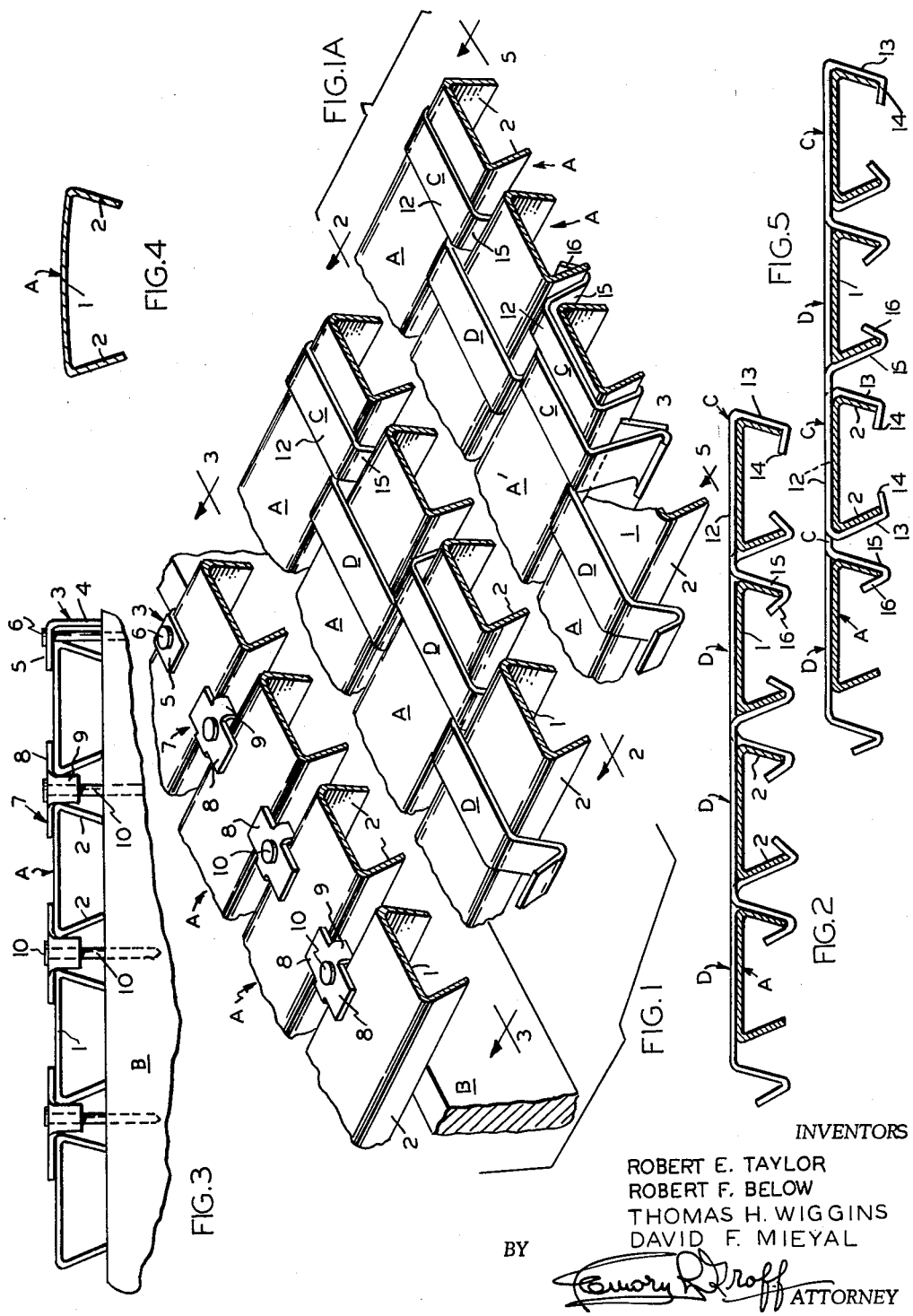

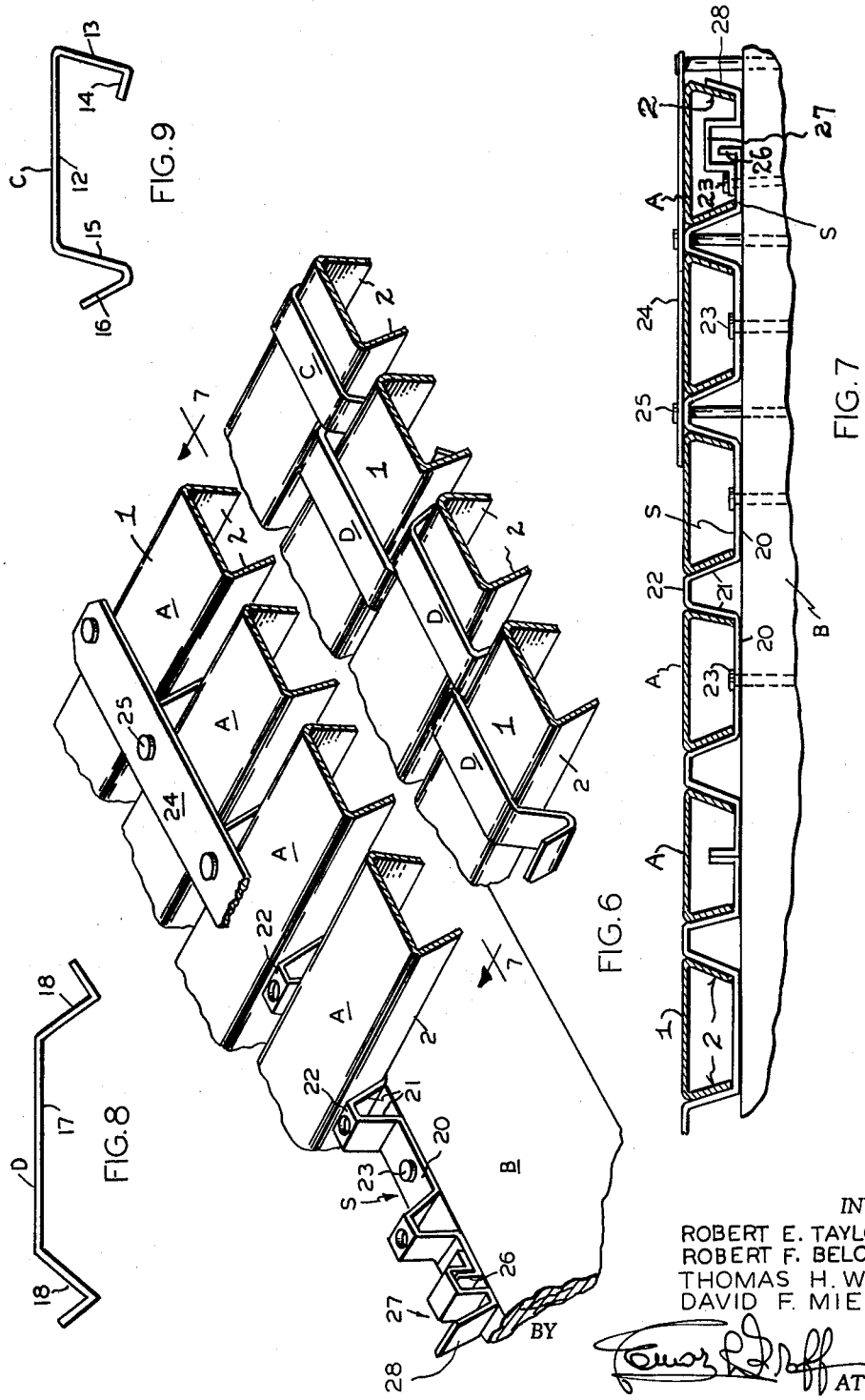

Jan. 25, 1966 R. E. TAYLOR ETAL 3,230,931
STEEL FLOOR SYSTEM FOR ANIMAL HOUSES
Filed Sept. 16, 1963 4 Sheets-Sheet 4
FIG. 12.
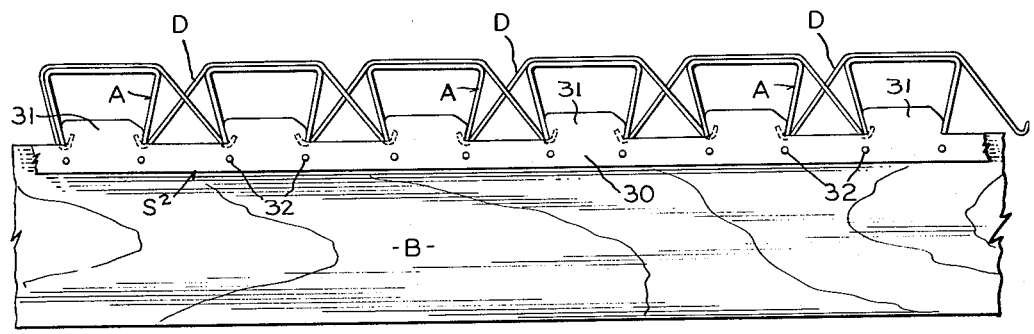
FIG. 13.
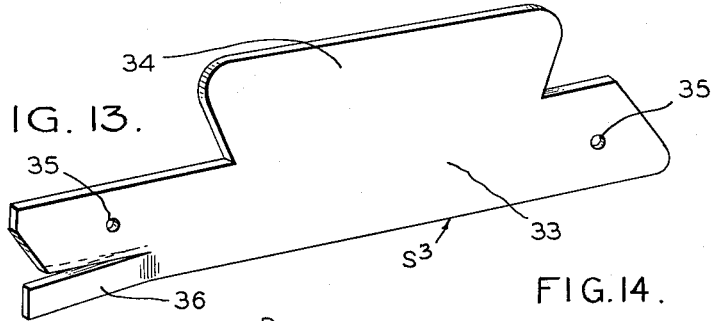
FIG. 14.
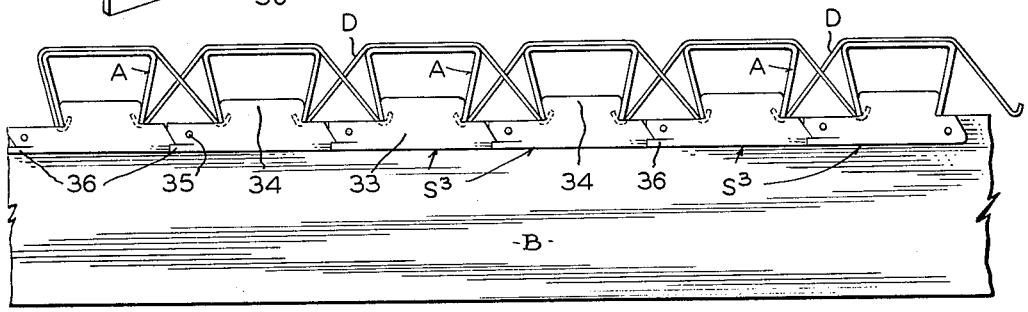
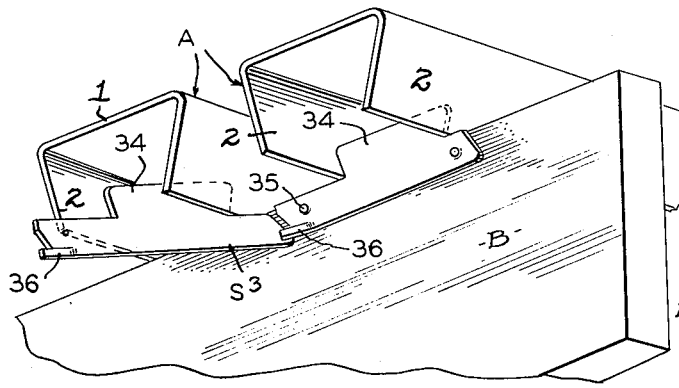
FIG. 15.
INVENTOR
ROBERT E. TAYLOR
ROBERT F. BELOW
THOMAS H. WIGGINS
DAVID F. MIEYAL
BY
ATTORNEY

United States Patent Office 3,230,931
Patented Jan. 25, 1966

3,230,931
STEEL FLOOR SYSTEM FOR ANIMAL HOUSES
Robert E. Taylor, Shaker Heights, Robert F. Below, Brecksville, Thomas H. Wiggins, Akron, and David F. Mieyal, Strongsville, Ohio, assignors to Republic Steel Corporation, Cleveland, Ohio, a corporation of New Jersey
Filed Sept. 16, 1963, Ser. No. 309,001
9 Claims. (Cl. 119—28)

This invention relates to animal husbandry, for example, to a floor for hog farrowing and/or finishing houses and for similar use for other farm animals.

The increasing trend to produce animals in better condition for marketing is to provide a more ideal and cleaner environment by confinement. Such confinement when combined with the use of slat type floors and applied to hogs has been shown to reduce the cost of producing hogs from 20 to 40 percent. This practice has resulted in lower cost gains in livestock weights; reduces diseases; and generally keeps the animals healthier, cleaner, and consequently attracts more favorable prices when sold.

The greatest problem in successful confined production has been the floor of the house or pen and the problems it creates in disposing of wastes. A major solution to the problem is the use of slatted floors raised off the ground through which refuse falls to a clean-out or liquid lagoon area below.

Up to the present, slatted floors have been primarily of wood. However, wood is basically unsatisfactory because it has a very short life and also tends to become slippery, soaked, and impregnated with waste matter which cannot be removed by washing the slatted floor, thereby providing a breeding ground for disease.

Accordingly, a primary object of the present invention is to provide a relatively inexpensive self-draining metal floor comprising rolled metal shapes of inverted channel formation which may be readily and easily manufactured, stocked, shipped, erected, and used to great advantages as compared with wood. These advantages are: the metal floor is more durable; they are virtually self-cleaning and stay sanitary while in use; they will readily support required live loads; and furthermore, they are simple and easy to repair when required.

That is to say, although wood, concrete or other materials may be used for the floor sections, steel has a number of advantages in this use.

The strength and formability of steel provides floor sections which are relatively light in weight with adequate strength to support required floor loading. In addition, steel, being non-porous, will not absorb liquids to harbor bacteria and parasites and is readily sanitized when necessary, an important characteristic in animal disease control. Further, the excellent abrasion resistance of steel provides long service-free life against wear from the constant movement of the confined animals.

Another object of the invention is to provide practical and stable means for effecting equal spacing of the inverted metal shapes and also securing them in fixed nonshafting relation to provide adequate and rigid support for the unstable load generated by the movement of heavy animals in groups.

A further object of the invention is to provide suitable and practical means in the nature of clips for effecting initial installation of the metal shapes and to also connect and support the floor members between beams to prevent any tendency of the individual floor members to heave, bend, or separate.

A still further object of the invention is to provide convenient means for effecting repair of existing individual channel members without the necessity of disassembling any other than the damaged channel.

With the above and other objects in view which will more readily appear as the nature of the invention is better understood, the same consists in the novel construction, combination, and arrangement of parts as hereinafter more fully described, illustrated, and claimed.

A preferred and practical embodiment of the invention is shown in the accompanying drawings, in which:

FIG. 1 is a perspective view illustrating the manner of assembling the inverted channel-shaped floor members in spaced relation on a supporting beam.

FIG. 1a is a perspective view on the order of FIG. 1, but showing how replacement of an inverted channel member may be readily effected.

FIG. 2 is a cross-sectional view taken on the line 2—2 between FIGS. 1 and 1a.

FIG. 3 is a cross-sectional view taken on the line 3—3 of FIG. 1.

FIG. 4 is a detail end cross-sectional view of one of the inverted channel members wherein the web portion is crowned to more readily effect drainage and more efficient cleaning to opposite edges of the member, the degree of crowning being clearly shown.

FIG. 5 is a cross-sectional view taken on the line 5—5 of FIG. 1a.

FIG. 6 is a detail perspective view of a modification of the invention utilizing a different form of channel spacing means as compared with FIGS. 1 and 3.

FIG. 7 is a vertical cross-sectional view taken on the line 7—7 of FIG. 6.

FIG. 8 is an end elevation of a center clip.

FIG. 9 is an end elevation of an end clip.

FIG. 12 is a detail side elevation showing a modified form of continuous spacer strip.

FIG. 13 is a detail perspective view of a further modified type of spacer, namely, an individual spacer which may be used in series with similar spacers.

FIG. 14 is a detail side elevation of a series of spacers shown in FIG. 13.

FIG. 15 is a detail perspective view illustrating the assembly of the individual spacers shown in FIG. 14.

Similar reference characters designate corresponding parts throughout the several figures of the drawings.

In all forms of the invention, the inverted channel shaped floor members are designated generally as A. These members are preferably roll-formed from appropriate gauge metal, the chemical composition of which resists corrosion.

Each inverted channel member comprises a web 1 and side flanges 2—2. Preferably, these side flanges are inclined inwardly to insure that waste matter will freely pass between adjacent flanges on down between the channel members. Also the flanges, while substantially rigid, may yield slightly to receive and interlock with the spacers of FIGS. 12–15 as will later appear.

The webs of the inverted channel members are slightly curved or crowned in order to insure self-cleaning. However, this crowning must not be too great as to create a hazard to animal footing. It has been found that a crown or rise of between 1/32 (.031) and 1/16 (.062) inches meets these requirements in a panel whose web is three inches wide. This range of crowning would prevail even where the width of the web is greater than three inches, the rise or crowning being proportionate to the defined width. In the example given, the ratio of crown per inch of width would be within the range of .0103 inch to .0207 inch which would prevail in channels whose webs are of greater width. That is, for a five inch web, the range of crown would be .0515–.1035 inch.

The side flanges 2—2 are inclined inwardly with respect to the point where they join the top surface or web. In that connection, the inclination of the flanges must not be great enough to reduce the strength and rigidity of the channel member. It has been determined that if these legs are inclined in the range of approximately 15° to 23° from the vertical that the requirement of being self-cleaning is accomplished without unduly weakening the structure.

Figure 10:
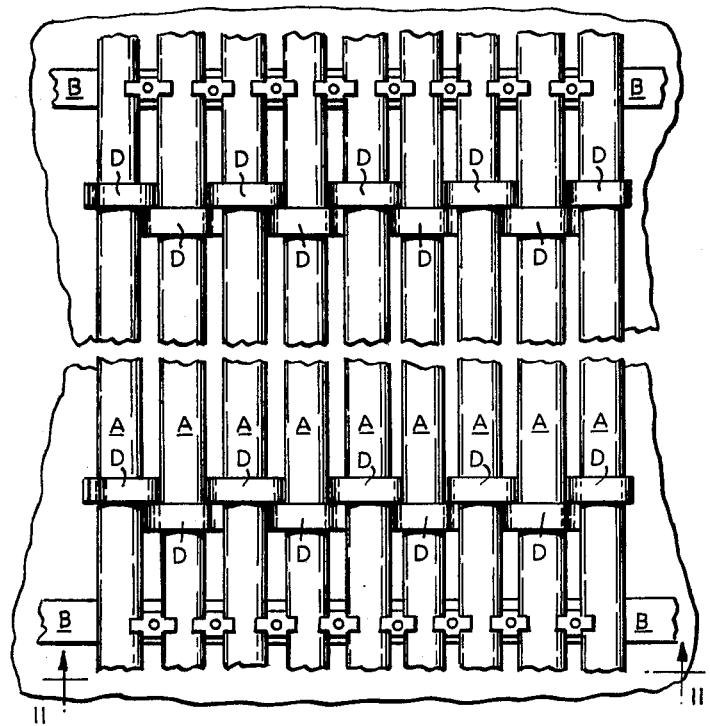
FIG. 10 is a top plan view of the steel floor system according to the invention.
Figure 11:
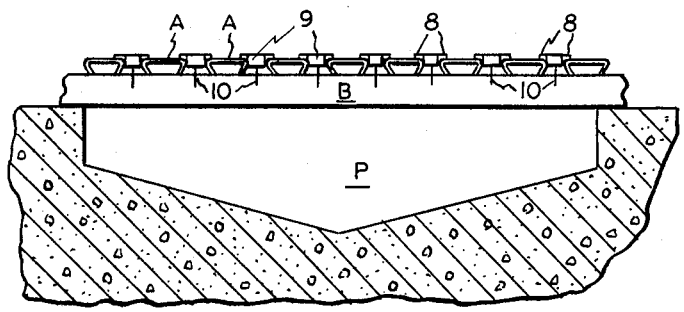
FIG. 11 is an end elevation view taken on the line 11—11 of FIG. 10.

The said members A are mounted on suitable floor supports such for example as transverse wood beams B. These beams B are creosoted or otherwise treated and are intended to span a pit P or other clean-out area for the collection and disposal of waste material which passes through the space between the inverted channel members A. In the latter connection, it will be understood that the floor members may be supported on the sides of the pit P as shown in FIG. 11.

Referring to FIG. 1 by way of example, the first or outside inverted channel member A has its lower end portions resting on the beam B and is held in place by a metal clip or end spacer 3 of angular shape as will appear from FIGS. 1 and 3. The leg 4 of the clip 3 is vertically disposed and has one edge resting on top of the beam B while the right-angularly disposed leg 5 is provided with an opening to receive a nail or equivalent fastening 6 which is driven through the hole and into the wood beam. The horizontal portion 5 of the clip bears on top of the inverted channel member A and holds it in place.

Once the first channel is in place, then additional channels are overlaid on the beams in uniform spaced relationship due to the fact that adjacent members are both held down and spaced by a substantially cruciform type of spacer clip 7. This clip has opposite wing portions 8 which overlie the top edges of related channel members and also has the downturned spacing members 9. The member 7 has a fastening receiving opening through which a nail 10 or equivalent fastening is driven with its lower end imbedded in the beam B.

As for the space between beams B, the floor members A are interlocked in the first instance by an end clip C having web portions 12 with a downturned leg portion 13 with an inwardly projecting hook 14 at one edge, while the opposite edge is provided with an outwardly projecting V-shaped hook whose legs 15 and 16 are intended to receive the lower edge portions of the adjacent inverted channel member.

After the first inverted floor member A has been put in place as above described, the next adjacent member A may be supported by the related beams B with the intermediate portion between beams held together against sidewise movement and in spaced relation by the center clips D shown in FIG. 8. These center clips include a web portion 17 and outwardly projecting symmetrical V-shaped hooks 18 at opposite ends thereof. As shown in FIG. 1, the portions of the floor members A between beams B will be supported in the notch of the V-shaped hook portions 18.

Thus, the floor members will not only be tied together for distribution of relative lateral movement, but will also have their weight and the load imposed thereon transmitted laterally to the adjacent members A by the symmetrical hooks 18 of the clips D. A modified form of floor member spacing elements is shown in FIGS. 6 and 7. In this case, a continuous strip may be used with portions thereof disposed in a horizontal plane to rest on the top of a beam together with spaced arched portions with inclined sides to fit the inclination of the flanges of the floor members.

As will be seen more specifically from FIGS. 6 and 7, the continuous spacer strip designated generally as S includes the flat portions 20 which alternate with the arched side wall portions 21 having flat top walls 22, the said side walls conforming in inclination to the sides of the floor members. In the first instance, the flat portions 20 of the strip are secured by nails or equivalent fastenings 23 to the beam B. It will thus be apparent that the space between adjacent arched portions cradles the individual floor members A. For the purpose of securing the floor members A, the top walls 22 of the strip S are provided with openings to register with similar openings in a securing strip 24 thereby to receive nails 25 to hold the strips 24 securely to the beam.

To support and space the two outside channels A, a saddle spacer 27 is provided, and located by matching nail receiving holes in the end flat portion of S and the horizontal flange of 27, as shown at the right-hand end of FIG. 7. The inclined side 28 of spacer 27 retains outermost side flange 2 of end channel member A.

In case it becomes necessary to provide repairs for the slatted floor, requiring for example the replacement of one of the members A, it is not necessary to disassemble the entire floor only to replace say, a single damaged channel member. FIG. 1a illustrates a floor section wherein one of the channels A′ has been replaced. To remove the damaged channel, it was only necessary to pull up the two spacer clips 7 on both sides of the channel and to cut the center clip D originally interlocking the medial portion of the channel with its adjacent channels. After positioning the new channel A; upon the beams B and reinstalling the two spacer clips 7, it will be apparent that there is no way by which a new center clip D could be inserted due to the fixed position of the two adjacent channels A. Two end clips are C installed in place of the single removed center clip D. As clearly shown in FIGS. 1a and 5, the two end clips are inserted in opposite directions, that is, with the V-shaped hooked portions 15, 16 in opposed directions.

The end clips C are readily inserted by first engaging the hook portion 15–16 under an adjacent side flange 2 and then pressing down on the web 12 of the clip to force the inwardly projecting hook 14 down the side flange 2 of the channel A′ until said hook clears the bottom edge of the side flange and snaps into the position shown in FIG. 5.

It will be understood that the above procedure for replacing a channel member would also apply in the case of the modified arrangement shown in FIGS. 6 and 7, the only difference being that instead of removing two adjacent spacer clips 7, the single securing strip 24 would be removed.

FIG. 12 shows a modified form of spacer $S^2$ for the floor members A. This spacer and holding member may be a continuous strip including a body 30 provided at its upper edge with a series of upstanding inverted wedge or keystone shaped floor engaging tongues 31 whose shape mates with the related inverted channels which constitute the said floor members. The body of the strip is provided with a series of fastenings receiving openings 32 whereby the strip may be readily secured to the beam.

The spacer clip $S^2$ would be made in lengths of about six feet and nailed to beam supports B before slats C are laid down. Slats would then be placed and a force applied by hand to press the slat onto the wedged portion of the spacer clip. This would hold it securely in place with no above-slat retainers.

In cases where a length of less than six feet is required, the spacer clip could be shortened by sawing or by breaking on a scored line in the clip. This clip serves both as a spacer to hold the required slot width and a retainer to hold the slat securely to the beam supports.

FIG. 13 shows an individual spacer $S^3$ which includes a body 33 having an upstanding inverted wedge shaped tongue 34 for fitting into the inverted channel of the related floor member. Also, the body 33 has fastening receiving openings 35 to enable the spacer to be attached to the beam B. For the purpose of aiding the assembly of the individual spacers, one vertical edge has a struck and aligning tab 36.

In practice, the floor section A would be placed on the beam support in a close proximity to its desired position. The spacer clip S, which is oversize for frictional engagement with the yielding legs of the channel, is then placed inside the channel so that the upper portion is beginning to force the legs apart. It is then driven against the beam supports by blows from a hammer and nailed into place.

The adjacent floor slat and spacer clip S³ are placed in the same manner with the exception that the leading edge of the spacer clip being implaced is made to fit under the tab 35 on the trailing edge of the spacer clip already fixed. This tab holds the spacer clips tight against the beam support without the use of another nail. Only one nail is required for each spacer clip with the exception of the first spacer clip installed.

If the spacer clip fits loosely in the channel, said channel can be struck with a hammer to drive it down on the angled trailing edge of the spacer clip already fixed.

This spacer clip will also retain and space the slats and leave a top surface free of obstructions.

From the foregoing, it will now be seen that the present invention provides a slatted metal floor construction which is not only readily erected in the first instance, but also is capable of easy repair when required. In addition, the arrangement of the floor members, the beams, and the clips tying the flanges of adjacent floor members together between the beams, adds stability and firmness to the entire floor in a manner to adequately handle maximum design loading forces with a lighter channel shape than would be possible without the use of clips D.

We claim:

1. A slatted metal floor for animal enclosures, comprising, in combination, floor beams spanning a clean-out area, a plurality of spaced apart metal inverted channel floor members laid across said floor beams, means overlying said members for securing same to said beams, spacer means disposed between each pair of said members over said beams and connected to said securing means, each of said members including a load bearing and spacing clip disposed between adjacent beams, and each of said clips provided with means engaging each adjacent member, whereby, both downward and lateral forces directed upon one member between adjacent beams will be transmitted to and absorbed by each adjacent member.

2. A slatted metal floor for animal enclosures, comprising, in combination, floor joist beams spanning a clean-out area, a plurality of metal floor members of inverted channel cross section laid across said beams with their web portions uppermost and their flanges extending downwardly and supported by said beams, a separate clip member for each of said floor members having a body portion overlying the top surface of each of said floor members between adjacent beams and provided with hook-like end portions, said clip members being laid in transverse staggered relationship with said hook portions of each clip receiving the downturned flanges of the adjacent floor members, and means for spacing and securing said floor members so said beams to maintain them in spaced slatted relationship for the clearance of waste material therebetween.

3. A slatted metal floor for animal enclosures, according to claim 2, wherein, said spacing and securing means comprises, a separate substantially cruciform spaced clip disposed between adjacent floor members and provided with oppositely extending flange portions overlying adjacent web portions of the floor members and having intermediate downturned spacer portions disposed between opposed flanges of the floor members, and a fastening member driven through each of said clips and into the underlying beam.

4. A slatted metal floor for animal enclosures, according to claim 2, wherein, said spacing and securing means comprises, a spacer strip attached to each of said beams and including a plurality of arched side wall portions between each pair of which is disposed one of said floor members, a securing strip overlying the top of said arched portions and said floor members therebetween, and fastening means driven through said securing strip and top of said arched portions into said beams.

5. A slatted metal floor for animal enclosures, according to claim 2, wherein, the web portion of each of said floor members is transversely arched, and said flanges are inclined inwardly toward one another.

6. A floor for animal enclosures, according to claim 2, wherein the tab of each of said members is transversely arched and each pair of downwardly extending flanges have their lower free edges disposed inwardly of the junction of the flanges and web, and the degree of crown of said web is in the range of .0103 to .0207 per inch of width of said web.

7. A floor for animal enclosures, according to claim 2, wherein the web of each of said members is transversely arched and each pair of downwardly extending flanges have their lower free edges disposed inwardly of the junction of the flanges and web, and the inward inclination of said flanges is within the range of 15°–23° from a vertical plane intersecting the junction of the web and flanges.

8. In a floor for animal enclosures, a plurality of inverted channel members laid in parallel spaced apart relation with the terminal edges of their flanges spaced closer together than where the flanges engage the web to provide a keystone-shaped area therebetween, said flanges of each member disposed in a single inclined plane with their terminal edges directed downwardly, supporting means for said members disposed transversely thereof and below the terminal edges of the flanges thereof for supporting engagement, and separate means connected with said supporting means and extending upwardly above the plane thereof engaging within said keystone-shaped areas of said channel members to maintain them in spaced relation and also hold them to said supporting means.

9. In a floor for animal enclosures according to claim 8, wherein the means for connecting the channels to the supporting means is a continuous strip secured to said supporting means and having spaced upstanding tongues of a profile to frictionally engage the inner keystone-shaped areas between the opposed flanges of each channel to constitute means for holding them to the supporting means.

References Cited by the Examiner

UNITED STATES PATENTS

| | | | |
|---|---|---|---|
| 813,317 | 2/1906 | Murray | 119—28 |
| 861,882 | 7/1907 | Noppel | 119—28 |
| 1,711,004 | 4/1929 | Youngman | 119—28 |
| 1,941,967 | 1/1934 | Bell | 189—34 |
| 3,044,586 | 7/1962 | Cassels | 189—82 |

SAMUEL KOREN, *Primary Examiner.*

HUGH R. CHAMBLEE, *Examiner.*